Patented July 10, 1951

2,559,624

UNITED STATES PATENT OFFICE 2,559,624

PREPARATION OF 7-HYDROXYPHENO-THIAZONE-3

David F. Houston, El Cerrito, and Ernest B. Kester, Berkeley, Calif., assignors to the United States of America as represented by the Secretary of Agriculture No Drawing. Application August 16, 1949,
Serial No. 110,661

1 Claim. (Cl. 260—243)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application relates to the preparation of 7 - hydroxyphenothiazone - 3 (also known as thionol). This compound is useful as a dyestuff, a dyestuff intermediate, a therapeutic agent, and an intermediate for preparing other therapeutically useful materials.

Methods are known for the preparation of this compound but in general they are not satisfactory because only low yields are obtained. Thus Bernthsen [Annalen der Chemie, 230, 187 (1885)] discloses the digestion of phenothiazine with concentrated sulphuric acid for 25 hours. The yield obtained is low, i. e., about 8%.

It has now been found that the desired compound can be obtained in comparatively high yields by reacting p, p'-dihydroxydiphenyl amine with sulphur in the presence of iodine as a catalyst.

The reaction by which the product is produced can be illustrated by the following equations:

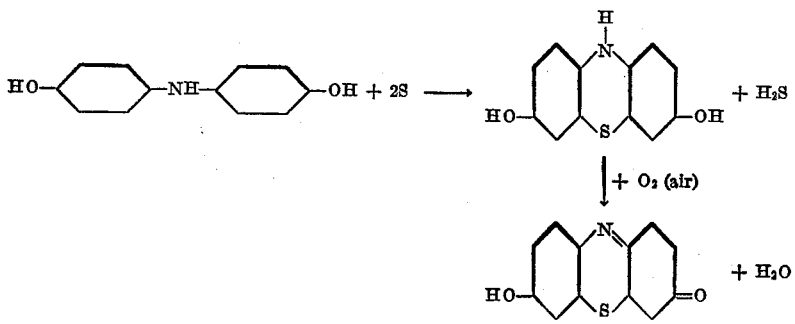

The following example demonstrates particular conditions, steps, and materials within the scope of this invention. It is understood that this example is merely illustrative and is not to be construed as a limitation of the invention to the particular details set forth.

Example

To 1.28 grams of sulphur (0.04 atoms) was added 4.06 grams of p,p'-dihydroxydiphenyl amine (0.02 mole) and the mixture ground to obtain intimate contact of the reactants. The ground mixture was then placed in a flask together with 0.1 g. of iodine. The flask was immersed in a molten metal bath preheated to 190° C. and held at 195° to 200° C. until the evolution of hydrogen sulphide was practically complete. This required 45–60 minutes, during which time the reaction mixture solidified as a cake-like mass. This mass was digested with 1 liter of boiling 0.7% aqueous sodium carbonate solution and then with a liter of boiling 0.6% aqueous sodium carbonate solution. The extracts so obtained were combined and filtered. 20 grams of lithium chloride was added to the hot extract and the solution chilled to 0° C. The cold solution was filtered and about 0.65 gram of a dark-colored impurity was thus removed. The filtrate was reheated and 25 grams of lithium chloride added. The solution was cooled whereupon the lithium salt of 7-hydroxyphenothiazone-3 crystallized out. The crystals were separated by filtration and 1.70 grams of the lithium salt was obtained; yield—36.3% of theoretical. The lithium salt crystals were dissolved in hot glacial acetic acid and the solution cooled to obtain the reddish-brown crystals of 7-hydroxyphenothiazone-3. These latter crystals were subjected to analyses and the following results obtained: C, 62.2%; H, 3.01%; N, 6.18% (theoretical: C, 62.87%; H, 3.08%; N, 6.11%).

As pointed out above, 7-hydroxyphenothiazone-3 is prepared by fusing p, p'-dihydroxydiphenylamine with sulphur. These two reagents are employed in approximately stoichiometrical proportions, i. e., 2 atoms of sulphur to each mole of the amine. The iodine is employed as a catalyst thus its proportion is not critical; generally it is employed in a proportion of about 0.5% to about 3%, based on the total amount of sulphur and amine. In order to obtain good contact of the sulphur and the amine it is preferable to grind these reagents together before they are placed in the reaction vessel. The temperature for the fusion can be varied from about 175° C. to about 250° C., a temperature of approximately 200° C. being preferred. The time of reaction is governed by the temperature used for the fusion and one can readily tell when the reaction is complete, as at that point hydrogen sulphide ceases to be liberated or at most is produced very slowly. In this fusion reaction the desired compound is formed in its leuco form as shown in the equations above. When the fusion mass is extracted to recover the product, the leuco compound is oxidized by contact with air to 7-hydroxyphenothiazone-3. This extraction is accomplished with an aqueous solution of a moderately strong alkali, for example, sodium carbonate, potassium carbonate, borax, potassium tetraborate, ammonium hydroxide, etc. The product which is present in the alkaline extract can be isolated in several ways. The preferred method involves adding an excess of a water-soluble lithium salt whereby the product will crystallize out as the lithium salt. Other metal salts such at water-soluble salts of calcium, barium, lead, etc., can be used but lithium is preferred as it gives a crystalline product. The salt form of the product is readily converted to the phenolic (or unsalified) form by crystallization from glacial acetic acid. The isolation from the alkaline extract can also be accomplished by acidifying the extract as by saturating it with $CO_2$ or by adding acetic acid, hydrochloric acid, or other acid whereupon the 7-hydroxyphenothiazone-3 will precipitate out of solution.

Having thus described the invention, what is claimed is:

A process for preparing 7-hydroxyphenothiazone-3 which comprises grinding a mixture containing approximately 2 atoms of sulphur per mole of p,p'-dihydroxydiphenylamine, adding about 2% of iodine to the ground material and fusing the mixture at a temperature of about 200° C. until the evolution of hydrogen sulphide has substantially ceased, extracting the reaction mass with an aqueous solution of a moderately strong alkali, and recovering 7-hydroxyphenothiazone-3 from the alkaline extract.

DAVID F. HOUSTON.
ERNEST B. KESTER.

REFERENCES CITED

The following references are of record in the file of this patent:

UNITED STATES PATENTS

| Number | Name | Date |
|---|---|---|
| 431,473 | Lange | July 1, 1890 |
| 522,897 | Herzberg et al. | July 10, 1894 |
| 1,497,720 | Herz et al. | July 27, 1924 |
| 2,024,477 | Scott | Dec. 17, 1935 |
| 2,162,686 | Eds et al. | July 13, 1939 |
| 2,433,658 | Geiger | Dec. 30, 1947 |

FOREIGN PATENTS

| Number | Country | Date |
|---|---|---|
| 103,301 | Germany | Apr. 12, 1899 |
| 117,921 | Germany | Feb. 7, 1901 |

OTHER REFERENCES

Schneider: Ber. der Deu. Chem., Vol. 32, pp. 689–691 (1899).